(12) United States Patent
Chen et al.

(10) Patent No.: US 9,958,999 B2
(45) Date of Patent: May 1, 2018

(54) CAPACITIVE TOUCH SENSOR WITH Z-SHAPED ELECTRODE PATTERN

(71) Applicant: 3M INNOVATIVE PROPERTIES COMPANY, St. Paul, MN (US)

(72) Inventors: Chi-Fan Chen, Taichung (TW); Roger W. Barton, Afton, MN (US); Matthew H. Frey, Cottage Grove, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 8 days.

(21) Appl. No.: 15/129,033

(22) PCT Filed: Apr. 1, 2015

(86) PCT No.: PCT/US2015/023870
§ 371 (c)(1),
(2) Date: Sep. 26, 2016

(87) PCT Pub. No.: WO2015/160516
PCT Pub. Date: Oct. 22, 2015

(65) Prior Publication Data
US 2017/0177112 A1     Jun. 22, 2017

Related U.S. Application Data

(60) Provisional application No. 61/980,922, filed on Apr. 17, 2014.

(51) Int. Cl.
G06F 3/044 (2006.01)
G06F 3/041 (2006.01)

(52) U.S. Cl.
CPC ............ G06F 3/044 (2013.01); G06F 3/0416 (2013.01); *G06F 2203/04112* (2013.01)

(58) Field of Classification Search
CPC ................. G06F 3/044; G06F 3/0416; G06F 2203/04112
See application file for complete search history.

(56) References Cited

U.S. PATENT DOCUMENTS

| | | |
|---|---|---|
| 6,147,680 A | 11/2000 | Tareev |
| 7,864,160 B2 | 1/2011 | Geaghan |
| 8,004,499 B2 | 8/2011 | Geaghan |
| 8,237,453 B2 | 8/2012 | Badaye |
| 8,384,691 B2 | 2/2013 | Frey |
| 2004/0265550 A1 | 12/2004 | Glatkowski |
| 2007/0074914 A1 | 4/2007 | Geaghan |
| 2010/0028811 A1 | 2/2010 | Geaghan |
| 2010/0302201 A1 | 12/2010 | Ritter |
| 2011/0018557 A1 | 1/2011 | Badaye |
| 2011/0139516 A1 | 6/2011 | Nirmal |
| 2012/0268143 A1 | 10/2012 | Badaye |

FOREIGN PATENT DOCUMENTS

| | | |
|---|---|---|
| EP | 2466433 | 6/2012 |
| WO | WO 2007-022226 | 2/2007 |
| WO | WO 2013-120071 | 8/2013 |

OTHER PUBLICATIONS

International Search Report for PCT International Application No. PCT/US2015/023870 dated Jul. 20, 2015, 3 pages.

*Primary Examiner* — Abhishek Sarma
(74) *Attorney, Agent, or Firm* — Clifton F. Richardson (57) ABSTRACT

Designs for touch sensor circuitry and touch sensor incorporating such circuitry are described. More particularly, touch sensor circuitry including multiple elongate electrodes that are interleaved with one another is described.

20 Claims, 10 Drawing Sheets

CAPACITIVE TOUCH SENSOR WITH Z-SHAPED ELECTRODE PATTERN

FIELD

The present invention relates to designs for touch sensor circuitry and touch sensors incorporating such circuitry.

BACKGROUND

Electronic displays are widely used. Although in the past the use of electronic displays has been primarily limited to computing applications such as desktop computers and notebook computers, as processing power has become more readily available, such capability has been integrated into a wide variety of applications. For example, it is now common to see electronic displays in applications such as smart phones, tablets, teller machines, gaming machines, automotive navigation systems, restaurant management systems, grocery store checkout lines, gas pumps, information kiosks, and hand-held data organizers to name a few.

Interactive visual displays often include some form of touch sensitive screen. Integrating touch sensitive panels with visual displays is becoming more common with the proliferation of portable multimedia devices, including smart phones and tablets. Capacitive touch sensing techniques for touch sensitive panels involve sensing a change in a signal due to capacitive coupling created by a touch on the touch panel. A voltage signal is applied to electrodes on the touch panel. A touch on the touch panel couples in a capacitance that alters the electric field in the vicinity of the touch. The change in the field is detected and used to determine the touch location.

Increasing the accuracy and/or decreasing the processing time of touch location determination is desirable. One previous patent that aids in fulfilling these needs is commonly owned and assigned U.S. Pat. No. 8,004,499 related to "Interleaved Electrodes for Touch Sensing." Sensor designs in U.S. Pat. No. 8,004,499 offer increased accuracy and decreased processing time by providing sub electrodes that accompany primary electrodes of a touch sensing system, and interleaving the sub-electrodes of the system, enabling interpolation at the edges of the touch surface. The present description offers a further improvement to this technology, enabling higher resolution and simpler and less expensive fabrication while maintaining the same number of sensor channels.

SUMMARY

In one aspect, the present description relates to a first array of elongate, electrically isolated conductive electrodes disposed on a first major surface of a first substrate for use in a touch sensor. The array includes a first electrode and second electrode and a third electrode. Each of the first electrode, second electrode and third electrode includes both a proximate end and a distal end. Additionally, each of the first electrode, second electrode and third electrode is connected to a touch controller circuit. Further, each of the first electrode, second electrode and third electrode has a z-shape. The z-shape includes a first elongate section, second elongate section, and a third elongate section, where the elongate sections are oriented parallel to one another. The first electrode is interleaved with the second electrode, and the second electrode is interleaved with the third electrode.

In another aspect, the present description relates to a touch sensor that includes a first array of elongate, electrically isolated conductive electrodes as described immediately above, and a second array of elongate, electrically isolated conductive electrodes disposed on a second major surface opposite the first major surface of the of the first substrate. The second array includes a fourth electrode, fifth electrode and sixth electrode. Each of the fourth electrode, fifth electrode and sixth electrode includes both a proximate end and a distal end. Additionally, each of the fourth electrode, fifth electrode and sixth electrode is connected to a touch controller circuit. Further, each of the fourth electrode, fifth electrode and sixth electrode has a z-shape. The z-shape includes a first elongate section, second elongate section, and a third elongate section, where the elongate sections are oriented parallel to one another. The fourth electrode is interleaved with the fifth electrode, and the fifth electrode is interleaved with the sixth electrode. In a different aspect, the present description may include the touch sensor described immediately above, with the exception that the second array is disposed on a second major surface of a second substrate instead of the second major surface of the first substrate.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements. The terms "proximate" and "distal" are used to identify the two ends of elongate electrodes in an array. A typical array according to the present disclosure is a one-dimensional array of parallel elongate electrodes each having a long axis, wherein the electrodes are arranged in approximately a line that is approximately perpendicular to the long axis of the elongate electrodes. For such a typical array, according to their use in the present application, the "proximate" ends of all of the elongate electrodes are arranged along a first edge of the array and the "distal" ends of all of the elongate electrodes are arranged along a second edge of the array that is opposite the first edge.

As used herein, when an element, component or layer for example is described as forming a "coincident interface" with, or being "on," "connected to," "coupled with," "stacked on" or "in contact with" another element, component or layer, it can be directly on, directly connected to, directly coupled with, directly stacked on, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

The electrode structure described herein can provide better accuracy, even with smaller detection objects, for contact or proximity sensors for touch input of information or instructions into electronic devices (e.g., computers, tablets, cellular telephones, televisions, smartphones, wrist-worn devices, etc.) These sensors are visible light transparent and useful in direct combination with a display, overlaying a display element, and interfaced with a device that drives the display (as a "touch screen" sensor).

The sensing area of a touch sensor is that region of the sensor that is intended to overlay, or that overlays, a viewable portion of an information display and is visible light transparent in order to allow viewability of the information display. Viewable portion of the information display refers to that portion of an information display that has changeable information content, e.g. the portion of a display "screen" that is occupied by pixels, e.g. the pixels of a liquid crystal display.

This disclosure further relates to touch screen sensors that are of the resistive, capacitive, and projected capacitive types. The electrode layers described herein can be utilized in projected capacitive touch screen sensors that are integrated with electronic displays. As a component of projected capacitive touch screen sensors, the electrode layers are useful for enabling high touch sensitivity, multi-touch detection, and stylus input.

Figure 1A:
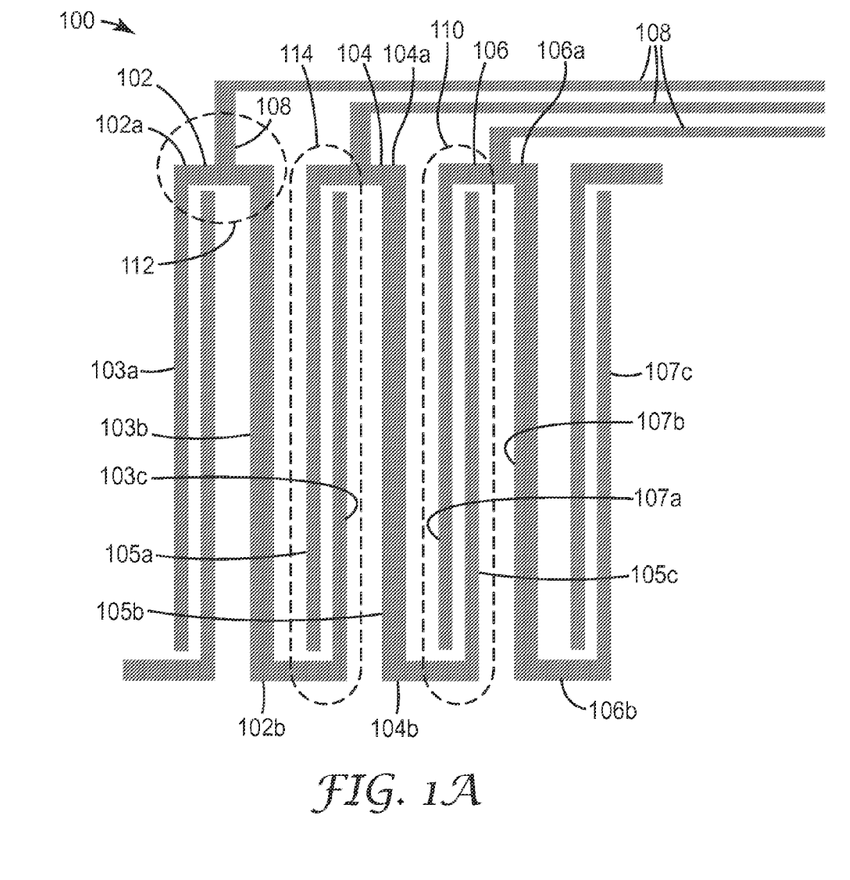
FIGS. 1A-C are top views of arrays of elongate, electrically isolated conductive electrodes for use in a touch sensor.

FIG. 1A illustrates a top view of a first array 100 of elongate, electrically isolated conductive electrodes on a first major surface of a first substrate for use in a touch sensor. FIG. 2 provides a simplified (bar-type rather than interleaved z-shape) cross-sectional view of the array 100 positioned on a first major surface 122 of a first substrate 120. First array 100 includes a first elongate electrode 102, second elongate electrode 104, and third elongate electrode 106. Each of the first electrode, second electrode and third electrode includes a proximate end (illustrated as elements 102a, 104a and 106a) and a distal end (illustrated as elements 102b, 104b and 106b). Each of the first electrode 102, second electrode 104 and third electrode 106 is connected at its respective proximate end to a touch controller circuit. For the array 100 of FIG. 1A, connection to a touch controller circuit would occur via interconnect traces or leads 108. Additionally, each of the first electrode, second electrode and third electrode has a z-shape. The z-shape includes a first elongate section, a second elongate section, and a third elongate section, wherein the elongate sections are oriented parallel to one another. For example, the first electrode 102 includes a first elongate section 103a, second elongate section 103b, and third elongate section 103c, each of which is oriented parallel to its respective counterparts. Second electrode 104 includes a first elongate section 105a, second elongate section 105b, and third elongate section 105c, each of which is oriented parallel to its respective counterparts. Third electrode 106 includes a first elongate section 107a, second elongate section 107b, and third elongate section 107c, each of which is oriented parallel to its respective counterparts.

For purposes of this description, a "z-shaped electrode" should be understood as an electrode that folds back on itself twice, one fold on the proximate end of the elongate sections, and one fold on the distal end of the elongate sections. "Z-shaped electrode" is used interchangeably herein with "electrode having a z-shape."

The substrate 120 of FIG. 2 can be made of any suitable material. Suitable substrate materials include electrically insulating materials, preferably transparent materials having high light transmission and clarity. Suitable transparent substrate materials include glass, polymeric films and ceramics. Specific examples of suitable substrate materials include chemically strengthened glass, polyethyleneterephthalate (PET), cyclic olefin polymer (COP), cyclic olefin copolymer (COC), polycarbonate (PC), poly(methyl methacrylate) (PMMA). Suitable substrates may be of any suitable thickness. Suitable thickness values range from between 1 micrometer and 1 centimeter, preferably between 2 micrometers and 500 micrometers, in some embodiments between 5 micrometers and 200 micrometers, and in some embodiments between 20 micrometers and 150 micrometers. The sensing circuitry, sensors, sensor systems, and arrays of the disclosure are not limited in terms of the substrate material and substrate thickness.

Returning to FIG. 1A, as clearly illustrated, the first electrode 102 is interleaved with the second electrode 104 (see, e.g., the interleave in area 114). The second electrode 104 is interleaved with the third electrode 106 (see, e.g., the interleave in area 110). The first elongate section of the second electrode 105a is disposed between the second and third elongate sections of the first electrode, 103b and 103c (see zone 114). The third elongate section of the second electrode 105c is disposed between the first and second elongate sections of the third electrode 107a and 107b (see zone 110). As noted, the electrodes connect to a control circuit at the proximate end 102a, 104a and 106a of each electrode. In some embodiments, these connections occur via interconnect traces that make connection with each electrode at a point on the electrode that is between the first and second parallel elongate sections of each electrode. For example, the connection between first electrode 102 and interconnect trace 108 occurs in an area 112 that is between the first parallel elongate section 102a and second parallel elongate section 102b.

As illustrated in FIG. 1A, in some embodiments, each elongate z-shaped electrode of an array is connected to a touch controller circuit at its respective proximate end, via interconnect traces or leads. In the embodiment of FIG. 1A, interconnect traces 108 are connected to the proximate end of each of elongate z-shaped electrodes 102, 104, and 106, and no interconnect traces are connected at the distal ends of the z-shaped electrodes 102, 104, and 106. Accordingly, a touch controller circuit is connected to the proximate end of each of the elongate z-shaped electrodes and no touch controller circuit is connected to the distal end of each of the elongate z-shaped electrodes (i.e., the touch controller circuit that is connected to the proximate ends is not connected to the distal ends).

Figure 1B:
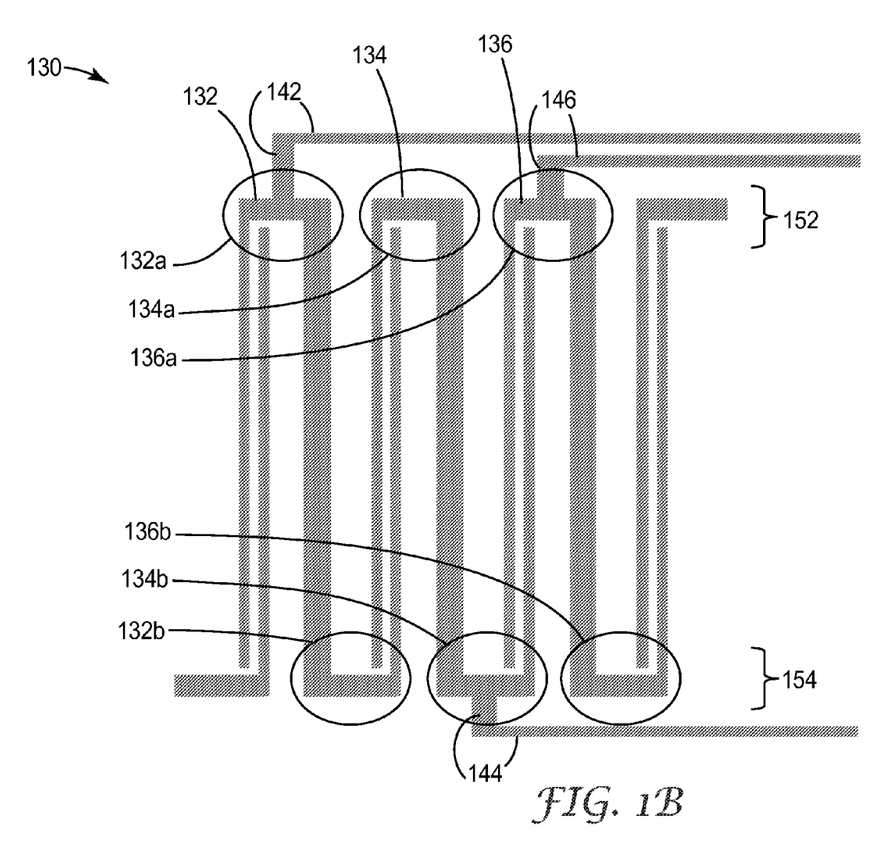
Figures 1C, 2:
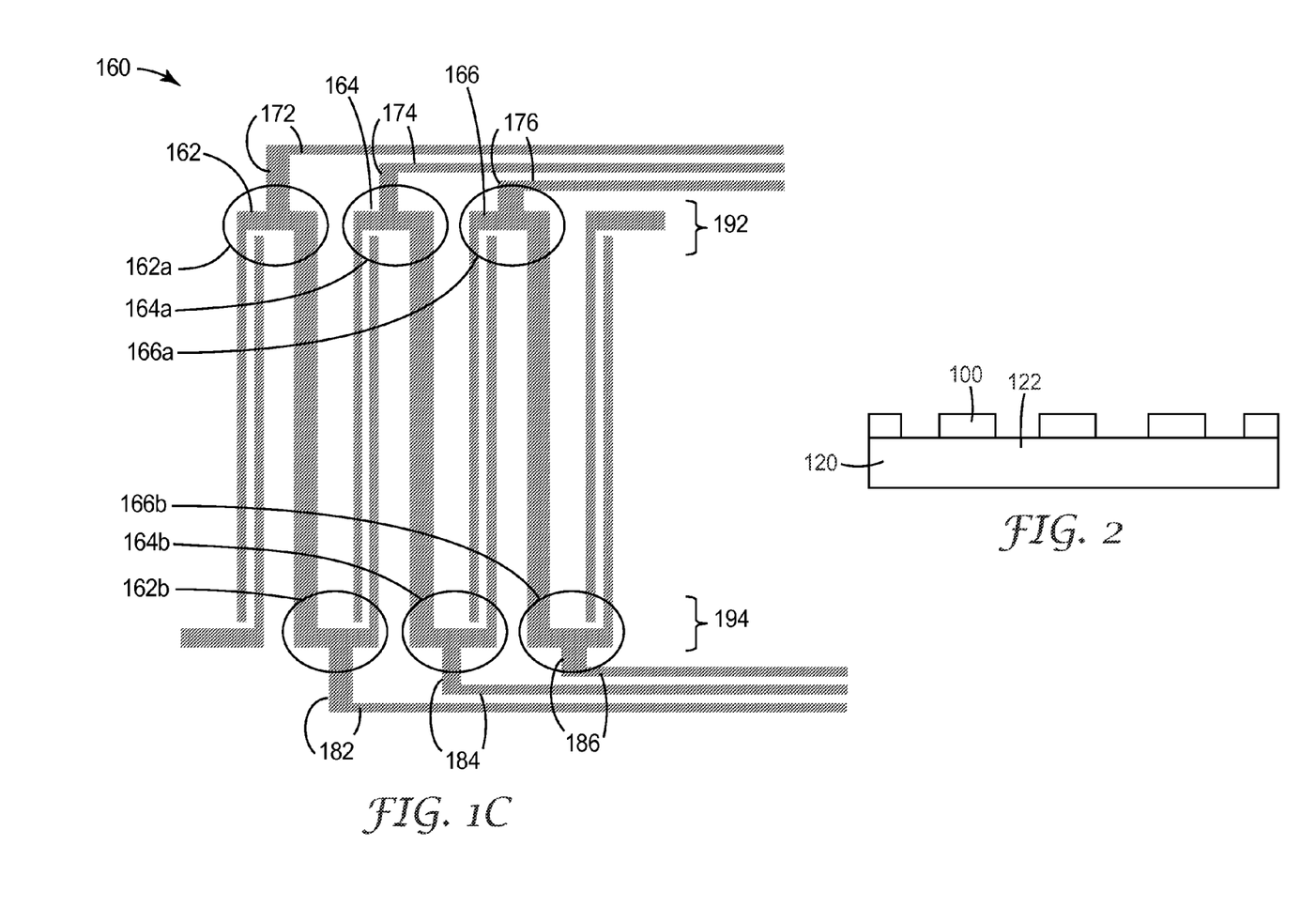
FIG. 2 is a cross-sectional view of an array of elongate, electrically isolated conductive electrodes for use in a touch sensor.

In some embodiments, as illustrated in FIG. 1B, one or more elongate z-shaped electrodes of an array are connected to a touch controller circuit at their respective proximate ends, without connection to the touch controller circuit at their distal ends, while one or more other elongate z-shaped electrodes of the array are connected to the touch controller circuit at their distal ends, without connection to the touch controller circuit at their proximate ends. Such connection of an elongate z-shaped electrodes can be made via interconnect traces or leads. Interconnect trace 142 is connected to a first z-shaped elongate electrode 132 at its proximate end 132a, interconnect trace 144 is connected to a second z-shaped elongate electrode 134 at its distal end 134b, and interconnect trace 146 is connected to a third z-shaped elongate electrode 136 at its proximate end 136a. In some embodiments, interconnect traces 142, 144, and 146 are connected to a touch controller circuit. FIG. 1B illustrates a top view of a first array 130 of elongate, electrically isolated conductive electrodes on a first major surface of a first substrate for use in a touch sensor. First array 130 includes a first elongate electrode 132, second elongate electrode 134, and third elongate electrode 136. The first electrode 132 is interleaved with the second electrode 134, and the second electrode 134 is interleaved with the third electrode 136. Each of the first electrode, second electrode and third electrode includes a proximate end (illustrated as elements 132a, 134a and 136a) and a distal end (illustrated as elements 132b, 134b and 136b). Each of the first electrode 132, second electrode 134 and third electrode 136 is connected to a respective interconnect traces 142, 144, and 146. In some embodiments, the electrodes are connected to a touch controller circuit via the interconnect traces 142, 144, and 146. For the array 130 of FIG. 1B, connection to a touch controller circuit would occur via interconnect traces or leads 142, 144, and 146. Additionally, each of the first electrode, second electrode and third electrode has a z-shape. The z-shape includes a first elongate section, a second elongate section, and a third elongate section, wherein the elongate sections are oriented parallel to one another. As illustrated in FIG. 1B, the proximate ends 132a, 134a, and 136a are arranged along a first edge 152 of the array 130 of the elongate electrodes 132, 134, and 136. The distal ends 132b, 134b, and 136b are arranged along a second edge 154 of the array, wherein the second edge is opposite the first edge. FIG. 1B illustrates an example of an array of z-shaped electrodes, having an alternating arrangement of interconnect connections (and in some embodiments touch controller circuit) to the electrode ends. In other embodiments where one or more elongate z-shaped electrodes of an array are connected to a touch controller circuit at their respective proximate ends, without connection to the touch controller circuit at their distal ends, while other elongate z-shaped electrodes of the array are connected to the touch controller circuit at their distal ends, without connection to the touch controller circuit at their proximate ends, the arrangement may not be alternating. Rather there may be groupings of neighboring, interleaved electrodes connected at their respective proximate ends only and groupings of neighboring, interleaved electrodes connected at their respective distal ends.

In some embodiments, as illustrated in FIG. 1C, elongate z-shaped electrodes of an array are connected to a touch controller circuit at both their respective proximate and distal ends. Such connection of an elongate z-shaped electrodes to a touch controller circuit can be made via interconnect traces or leads. Interconnect traces 172 and 182 are connected to a first z-shaped elongate electrode 162, at its proximate end 162a and distal end 162b, respectively. Interconnect traces 174 and 184 are connected to a second z-shaped elongate electrode 164 at its proximate end 164a and distal end 164b, respectively. Interconnect traces 176 and 186 are connected to a third z-shaped elongate electrode 166 at its proximate end 166a and distal end 166b, respectively. In some embodiments, interconnect traces 172, 174, 176, 182, 184, and 186 are connected to a touch controller circuit. FIG. 1C illustrates a top view of a first array 160 of elongate, electrically isolated conductive electrodes on a first major surface of a first substrate for use in a touch sensor. First array 160 includes a first elongate electrode 162, second elongate electrode 164, and third elongate electrode 166. Each of the first electrode, second electrode and third electrode includes a proximate end (illustrated as elements 162a, 164a and 166a) and a distal end (illustrated as elements 162b, 164b and 166b). Additionally, each of the first electrode, second electrode and third electrode has a z-shape. The z-shape includes a first elongate section, a second elongate section, and a third elongate section, wherein the elongate sections are oriented parallel to one another. The first electrode 162 is interleaved with the second electrode 164, and the second electrode 164 is interleaved with the third electrode 166. As illustrated in FIG. 1C, the proximate ends 162a, 164a, and 166a are arranged along a first edge 192 of the array 160 of the elongate electrodes 162, 164, and 166. The distal ends 162b, 164b, and 166b are arranged along a second edge 194 of the array, wherein the second edge is opposite the first edge. FIG. 1C illustrates an example of an array of interleaved z-shaped electrodes, having interconnect connections (and in some embodiments touch controller circuit connections) to each electrode at both its proximate end and its distal end.

In some embodiments, the second elongate section of each electrode (102b, 104b, 106b) has a greater cross-sectional width than the first and third elongate sections. In such embodiments, the second elongate sections are described herein as functioning as primary sub-electrodes, while first and third elongate sections (103a and c, 105a and c, 107a and c) are described herein as functioning as auxiliary sub-electrodes of the electrode. Each primary sub-electrode may be capable of producing greater capacitive coupling to a touch in proximity with the touch surface in relation to capacitive coupling of the two auxiliary sub-electrodes. The auxiliary sub-electrodes of each electrode are arranged in an interleaved pattern configured to increase an effective area of capacitive coupling associated with each electrode.

Electrodes 102, 104, 106, 132, 134, 136, 162, 164, and 166 may be made up of any number of appropriate conductive materials used in touch sensor. For example, in one embodiment, electrodes may be comprised of a transparent conductive material. Particular appropriate transparent conductive materials may include transparent conducting metal oxides (TCO), electrically conductive polymers, thin film metals, and graphene (including multilayer graphene, for example 2-layer graphene, and few-layer graphene). Useful TCO's include zinc oxide, tin oxide, and fluorine doped tin oxide. In a preferred embodiment, the transparent conductive material may be indium tin oxide. The electrodes 102, 104, 106, 132, 134, 136, 162, 164, and 166 may be made up of two or more materials, for example in the form of a transparent conductive composite or a transparent conductive multilayer material. Examples of useful conductive composites include a carbon nanotube-filled polymer or an interconnected carbon nanotube layer that is bonded to a substrate surface using a polymeric or inorganic binder. In some embodiments, the carbon nanotubes are embedded in a substrate. Examples of useful carbon nanotube layers are described in U.S. Patent Application No. US 2004/0265550 A1. Other examples of useful conductive composites include a metallic nanowire-filled polymer or an interconnected metal nanowire layer that is bonded to a substrate using a polymeric or inorganic binder. In some embodiments, the nanowires are embedded in a substrate. Examples of useful metal nanowire layers are described in PCT Publication No. WO 2007/022226 A2. Useful metallic nanowires may comprise, for example, silver, copper, nickel, gold, or combinations thereof (for example in the form of alloys, nanowire mixtures, or core-shell nanowires). Examples of useful conductive multilayer materials include thin film stacks that include one or both of a transparent conducting metal oxide (e.g., zinc oxide, fluorine-doped tin oxide, tin oxide, indium tin oxide, and the like) or thin film metal (e.g., silver, gold, silver-gold alloy). Examples of useful transparent conductive multilayers are described in U.S. Patent Publication No. 2011/0139516 A1. Useful conductive multilayer materials may include one or more transparent conducting metal oxide thin film layers (e.g., 1, 2, 3, 4, 5, or even more metal oxide layers). Useful conductive multilayer materials may include one or more thin film metal layers (e.g., 1, 2, 3, 4, 5, or even more thin film metal layers). Useful thin film metal layers are preferably less than 20 nm in thickness, more preferably less than 10 nm, more preferably less than 5 nm in thickness. Transparent conductive metal oxide thin film layers may be separated by electrically insulating materials (e.g., silicon dioxide) or thin film metal layers described above. Thin film metal layers may be separated by insulating materials or thin film transparent conductive metal oxide layers described above.

Figure 6A:
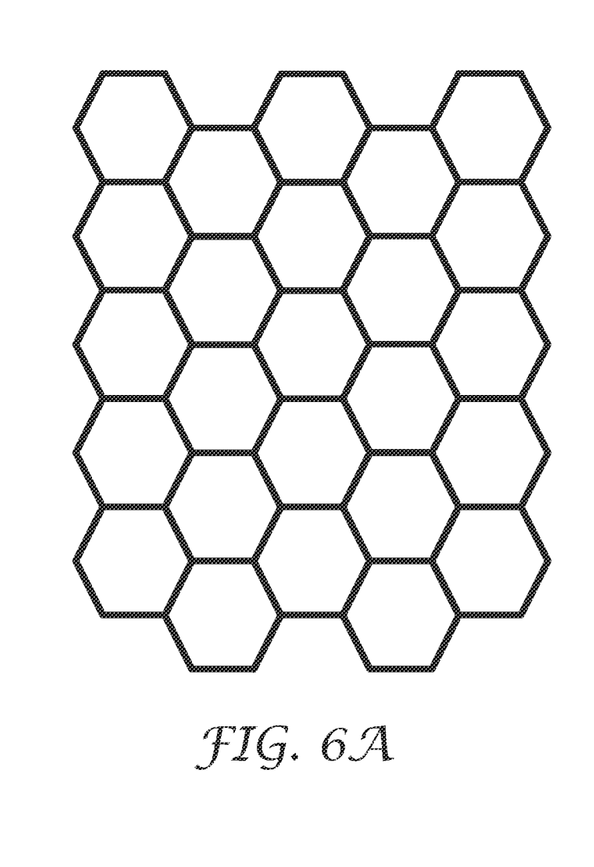
FIGS. 6A-B illustrate exemplary metal mesh patterns that may be used in conductive electrodes according to the present description.
Figure 6B:
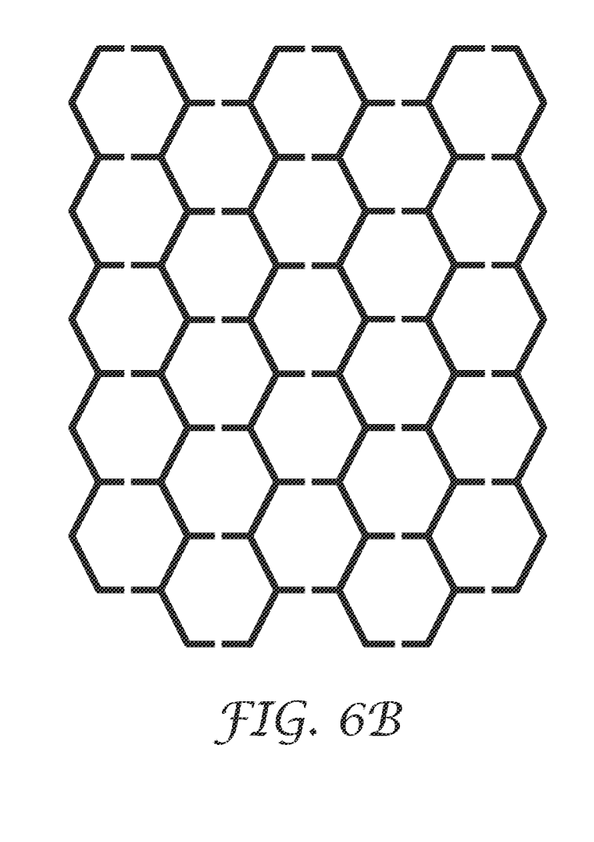
Figure 7A:
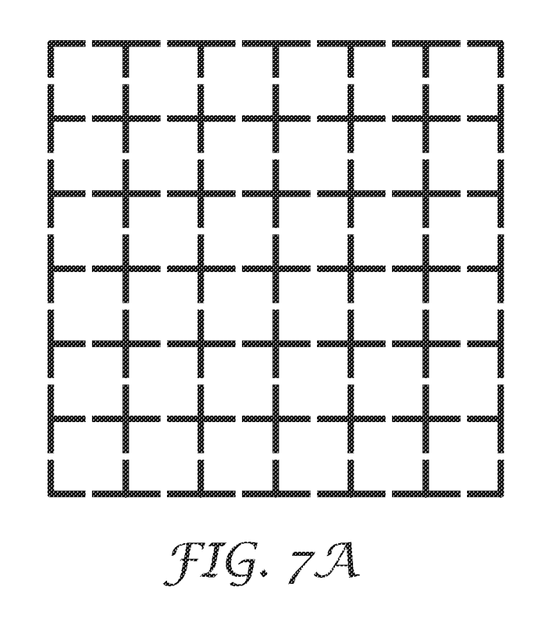
FIGS. 7A-B illustrate exemplary metal mesh patterns that may be used in conductive electrodes according to the present description.
Figure 7B:
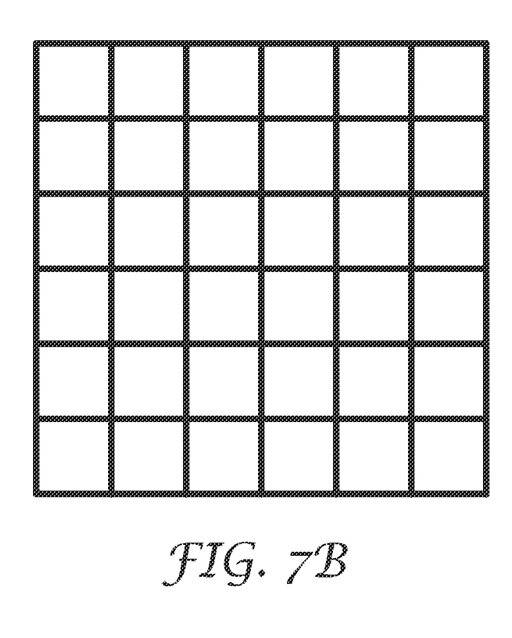

In another embodiment, the electrodes may be made up of a transparent conductive mesh network of conductive traces, for example thin film metal traces. One specific embodiment may include silver mesh conductors. The silver mesh can be formed into periodic patterns on the surface of the substrate, such as the hexagonal patterns shown in FIGS. 6A and 6B. In other embodiments, the mesh conductors may be formed in square, circle or other period patterns. Exemplary square metal mesh patterns are illustrated in FIGS. 7A and 7B. Other useful mesh patterns include random or pseudorandom open cell geometries. In yet another embodiment, the electrodes may be made up of a metal mesh. The metal mesh comprises copper, silver, gold, aluminum, zinc, nickel, or iron or other appropriate metals. Useful transparent conductive metal mesh networks of traces are described in more detail in U.S. Pat. No. 8,384,691. In some embodiments, the electrodes are formed using a combination of one or more of a transparent conductive material, transparent conductive composite, transparent conductive multilayer, and transparent conductive mesh network of traces.

The touch sensor circuitry of the present disclosure is advantageously formed using transparent conductive materials, composites, multilayers or meshes having low sheet resistance. Specifically, realization of the sensing attributes of the z-shape of the electrodes demands low electrical resistance along the various sub-electrodes. Accordingly, preferred embodiments of the disclosure include any of the electrode and array designs described herein, specifically formed using any one or more of transparent conductive materials, transparent conductive composites, transparent conductive multilayers, or transparent conductive mesh networks of traces, wherein the sheet resistance within the electrode is between 0.1 and 300 ohms per square, in some embodiments between 0.2 and 100 ohms per square, in some embodiments between 1 and 75 ohms per square, and in some embodiments between 5 and 50 ohms per square.

Figure 3:
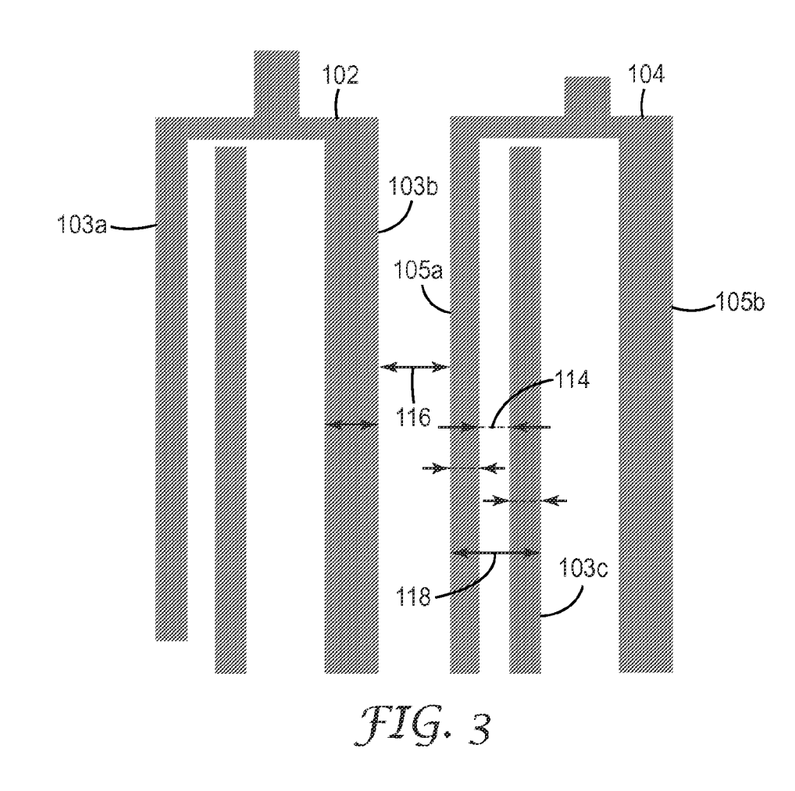
FIG. 3 is a close-up top view of a portion of an array of elongate, electrically isolated conductive electrodes for use in a touch sensor.

In one aspect, the present description may also be understood as a touch sensor that incorporates the array of elongate, electrically isolated conductive electrodes described herein. Such a touch sensor may, in certain embodiments, be intended for use with a stylus. In other embodiments, such a touch sensor may be intended for use with finger touch, especially small finger touch. FIG. 3 provides a close-up portion (i.e., top portion, with reference to the array depicted in FIG. 1) of the array described above to better illustrate further features of the invention. In a preferred embodiment, the distance 114 between the first elongate section of the second electrode 105a and the third elongate section of the first electrode 103c is less than the width of the tip of a stylus used in combination with the touch sensor. An example of the footprint of the tip of a stylus is illustrated by shaded portion 118. Additionally, the distance between the first elongate section of the second electrode 105a and the second elongate section of the first electrode 103b is less than four times (4×) the diameter of the tip of the stylus used in combination with the touch sensor.

Some embodiments of the present disclosure are sensor systems comprising any of the sensors, sensor circuitry, or arrays, in combination with a stylus. A useful stylus of the sensor system may be active or passive. A passive stylus is a stylus which doesn't have electronic components in itself. Usually, the passive stylus will consist of a metal stick for changing the local electric field as the signal. An active stylus is a stylus that is more complicated and comprises electronic components. The electronic components can send out a signal which is readable for the sensor in the touch panel under the electronic device. A useful stylus for the sensor system may include a tip that is electrically conductive or electrically insulating. A useful stylus for the sensor system may include a tip that comprises a composite material comprising electrically conductive filler particles in a matrix, for example a polymeric matrix (e.g., an electrically insulating polymeric matrix). Useful polymers for forming the stylus tip or a polymeric matrix of the stylus tip include fluoropolymers and hydrocarbon polymers. Sensor systems of the disclosure that include a stylus are not limited with respect to the materials that comprise the stylus. The use of narrower, auxiliary sub-electrodes (e.g., first and third elongate sections described for FIG. 1) in addition to the primary sub-electrodes (second elongate sections) allows for a smaller mutual capacitance, while keeping the sensitivity for the stylus the same. The narrower first and third elongate sections can double the resolutions in each dimension, of a touch sensor in which they are incorporated, without increasing the number of channels of the sensor circuit. It is advantageous to limit the number of channels of a sensor circuit, because each channel generally requires input/output means, as well as a portion of the sensing duty cycle, which can add cost or decrease the speed performance of a sensor system, or both. Accordingly, the "z-shaped" design has much more resolution to support the smaller tip of a stylus (or potentially small finger) for applications such as drawing, painting, noting and signing on a touch sensor.

Figure 10:
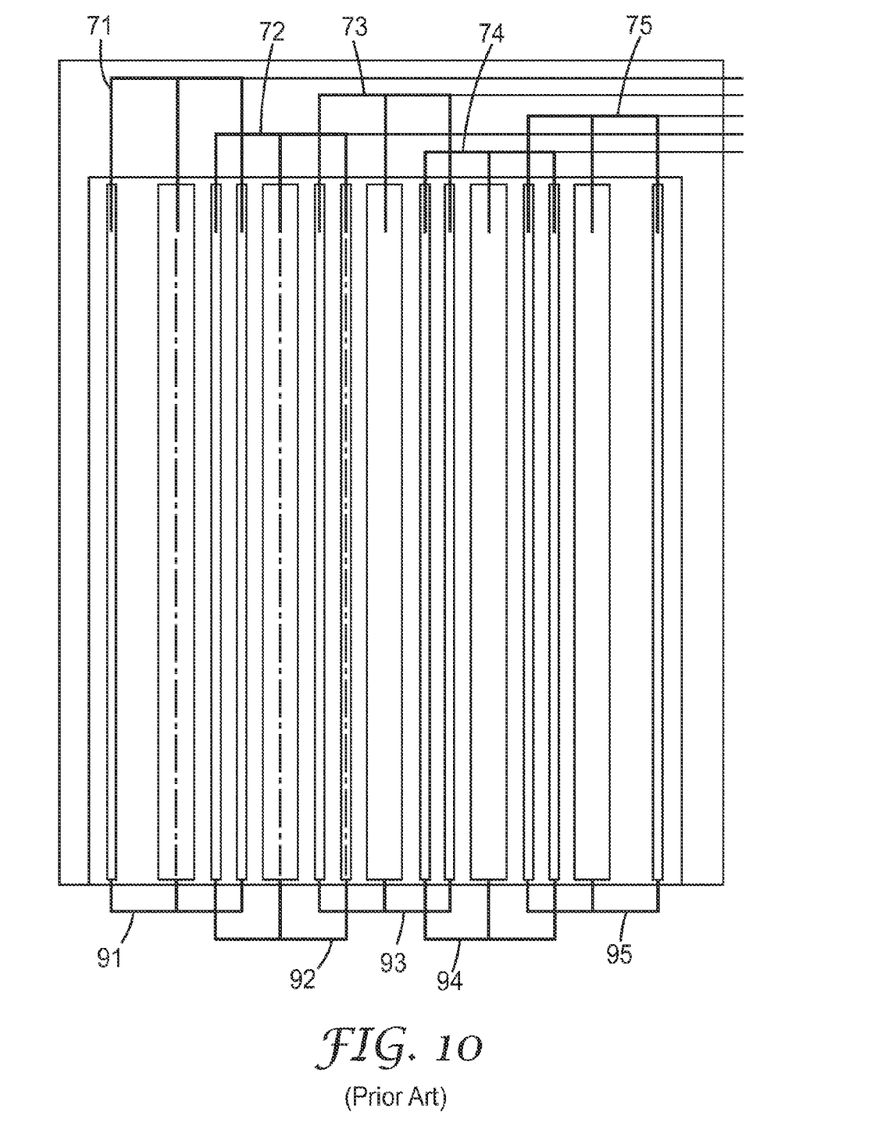
FIG. 10 is a prior art top view of an array of electrically isolated conductive electrodes for use in a touch sensor.

The present construction offers a further benefit over increased accuracy and resolution due to the interleaving of electrodes. The further benefit of the presently described array is specifically tied to the z-shape of the array. This allows for a manufacturer to interleave the electrodes while allowing for the same number of sensor channels. It further allows one to eliminate the concerns with interleaving of interconnect circuitry that is routed to the electrodes (see, e.g., managing and electrically isolating interconnects 71-75 and 91-95 in Prior Art FIG. 10—from commonly owned and assigned U.S. Pat. No. 8,004,499). These two aspects offer another major benefit beyond the enhanced accuracy and resolution of a touch device using the currently described array.

Figure 4:
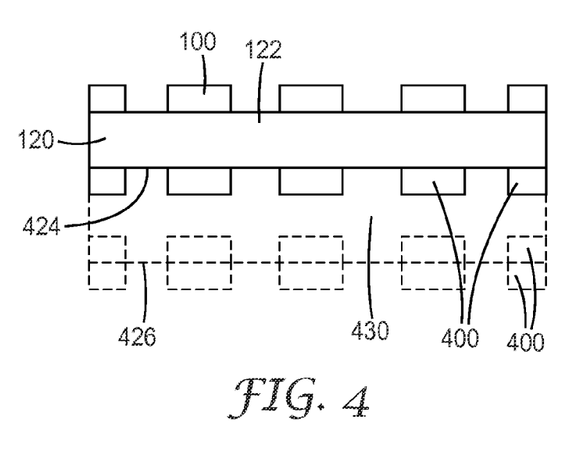
FIG. 4 is a cross-sectional view of a first and second array of elongate, electrically isolated conductive electrodes for use in a touch sensor.

In another aspect, the present description further relates to a touch sensor that may include the array described above, as well as a second array of elongate, electrically isolated conductive electrodes disposed on a surface opposite the first surface of the first substrate. FIG. 4 illustrates the cross-section of such a construction. Second array 400 may be located on a second major surface 424 that is directly opposite the first major surface 122 of the first substrate 120. Alternatively, the second array 400 may be located on a second major surface 426 of a second substrate 430, as also illustrated in FIG. 4. Furthermore, the second array 400 may be located on the second major surface 424 of a second substrate 430.

Figure 5:
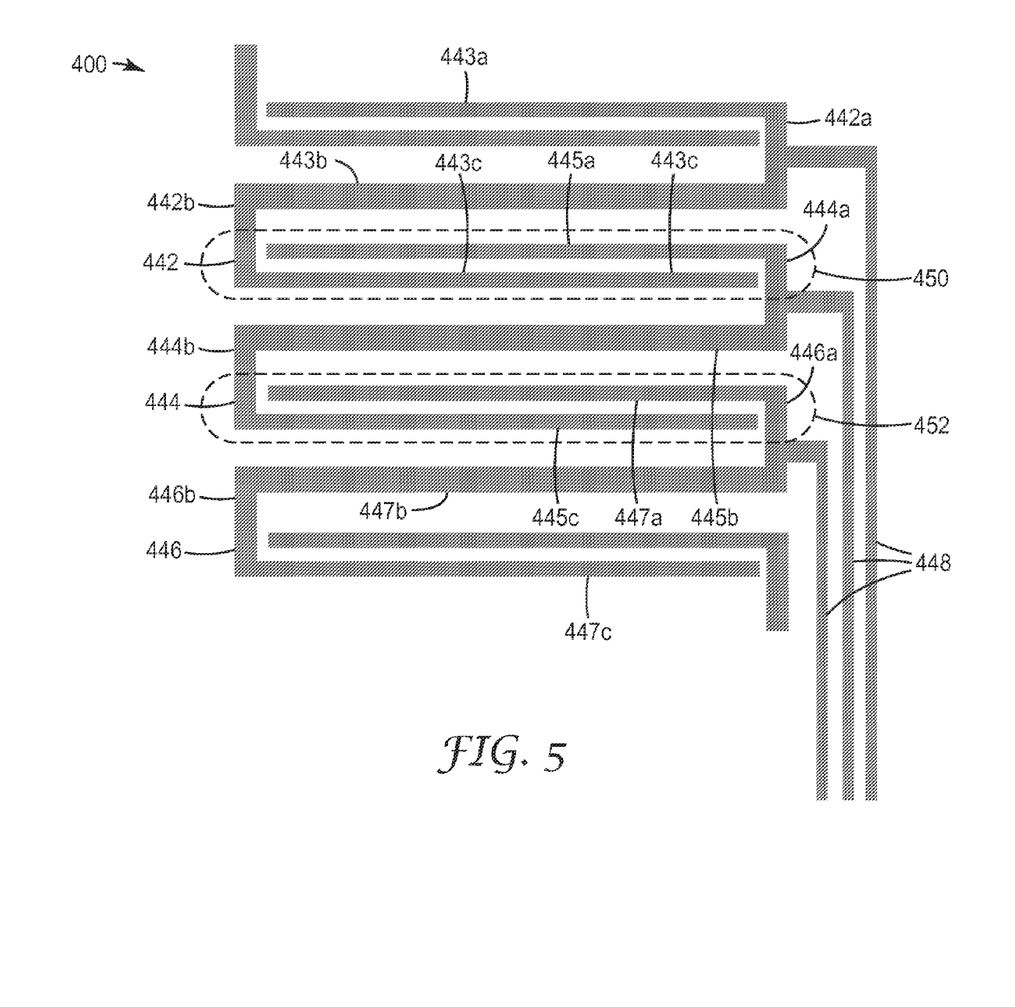
FIG. 5 is a top view of an array of elongate, electrically isolated conductive electrodes for use in a touch sensor.

FIG. 5 provides a detailed view of second array 400 from a top view. Second array of elongate, electrically isolated conductive electrodes 400 includes a fourth electrode 442, fifth electrode 444, and sixth electrode 446. As with the first, second and third electrodes of the first array, each of the fourth, fifth, and sixth electrodes of the second array comprises a proximate end (illustrated as elements 442a, 444a, and 446a) and distal end (illustrated as elements 442b, 444b, and 446b). Each of the fourth electrode 442, fifth electrode 444 and sixth electrode 446 is connected at its respective proximate end to a touch controller circuit. Connection to a touch controller circuit would occur via interconnect traces or leads 448. Additionally, each of the fourth electrode, fifth electrode and sixth elongate electrode has a z-shape. The z-shape includes a first elongate section, a second elongate section, and a third elongate section, wherein the elongate sections are oriented parallel to one another. For example, the fourth electrode 442 includes a first elongate section 443a, second elongate section 443b, and third elongate section 443c, each of which is oriented parallel to its respective counterparts. Fifth electrode 444 includes a first elongate section 445a, second elongate section 445b, and third elongate section 445c, each of which is oriented parallel to its respective counterparts. Sixth electrode 446 includes a first elongate section 447a, second elongate section 447b, and third elongate section 447c, each of which is oriented parallel to its respective counterparts. As clearly illustrated, the fourth electrode 442 is interleaved with the fifth electrode 444 (see, e.g., the interleave in area 450). The fifth electrode 444 is interleaved with the sixth electrode 446 (see, e.g., the interleave in area 452). The first elongate section of the fifth electrode 445a is disposed between the second and third elongate sections of the fourth electrode, 443b and 443c (see zone 450). The third elongate section of the fifth electrode 445c is disposed between the first and second elongate sections of the sixth electrode 447a and 447b (see zone 452).

In some embodiments, for a second array of electrically conductive z-shaped electrodes, one or more elongate z-shaped electrodes of the second array are connected to a touch controller circuit at their respective proximate ends, without connection to the touch controller circuit at their distal ends, while one or more other elongate z-shaped electrodes of the second array are connected to the touch controller circuit at their distal ends, without connection to the touch controller circuit at their proximate ends. FIG. 1B illustrates such a design for the first array.

In some embodiments, for a second array of electrically conductive z-shaped electrodes, elongate z-shaped electrodes are connected to a touch controller circuit at both their respective proximate and distal ends. FIG. 1C illustrates such a design for the first array.

Figure 8:
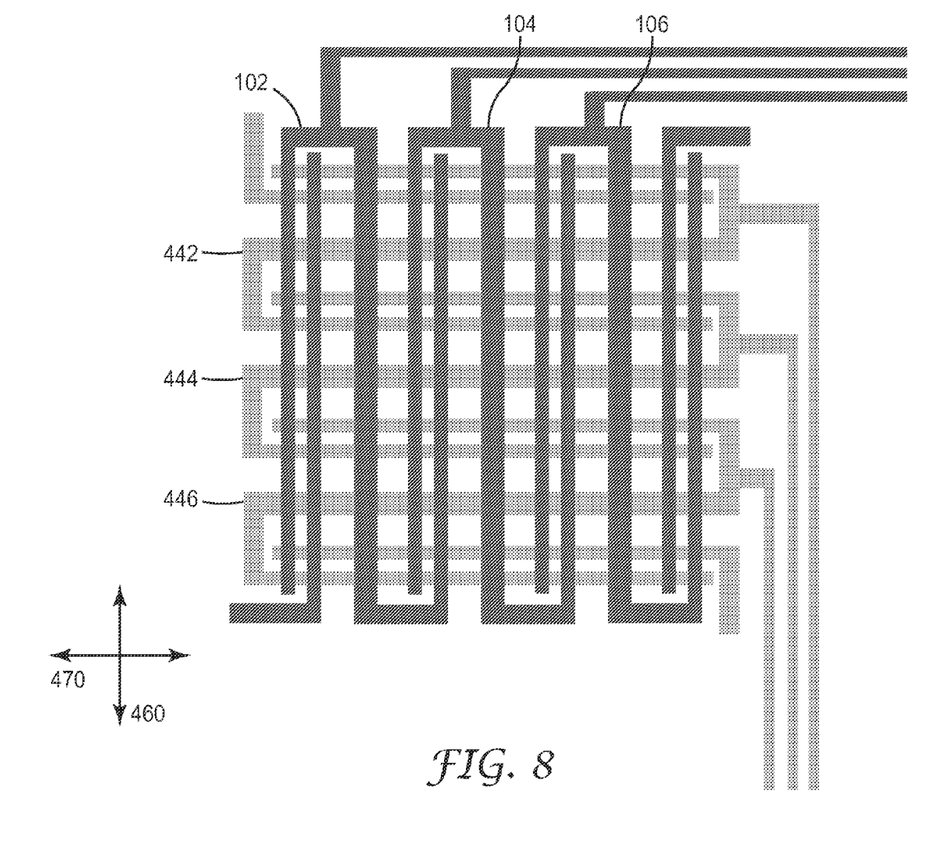
FIG. 8 is a top view of a stack of two arrays of elongate, electrically isolated conductive electrodes for use in a touch sensor.

Whether the first and second arrays of electrodes are positioned on opposing sides of a common substrate 120, or potentially on surface of two different substrates (e.g. 120 and 430), the two arrays may be used in conjunction to form a touch sensor. As illustrated in FIG. 8, the two arrays may be positioned such that the elongate sections of the electrodes of one array run orthogonal, for example, to those of the opposing array. In other words, the first electrode 102, second electrode 104 and third electrode 106 are oriented in a first direction (see direction 460). The fourth electrode 442, fifth electrode 444 and sixth electrode 446 are oriented in a second direction (see direction 470). The first direction, as illustrated, is orthogonal to the second direction. Additionally, the first array overlaps the second array. In some embodiments, the first direction and the second direction may not be orthogonal. The first direction and the second direction are non-parallel.

Figure 9:
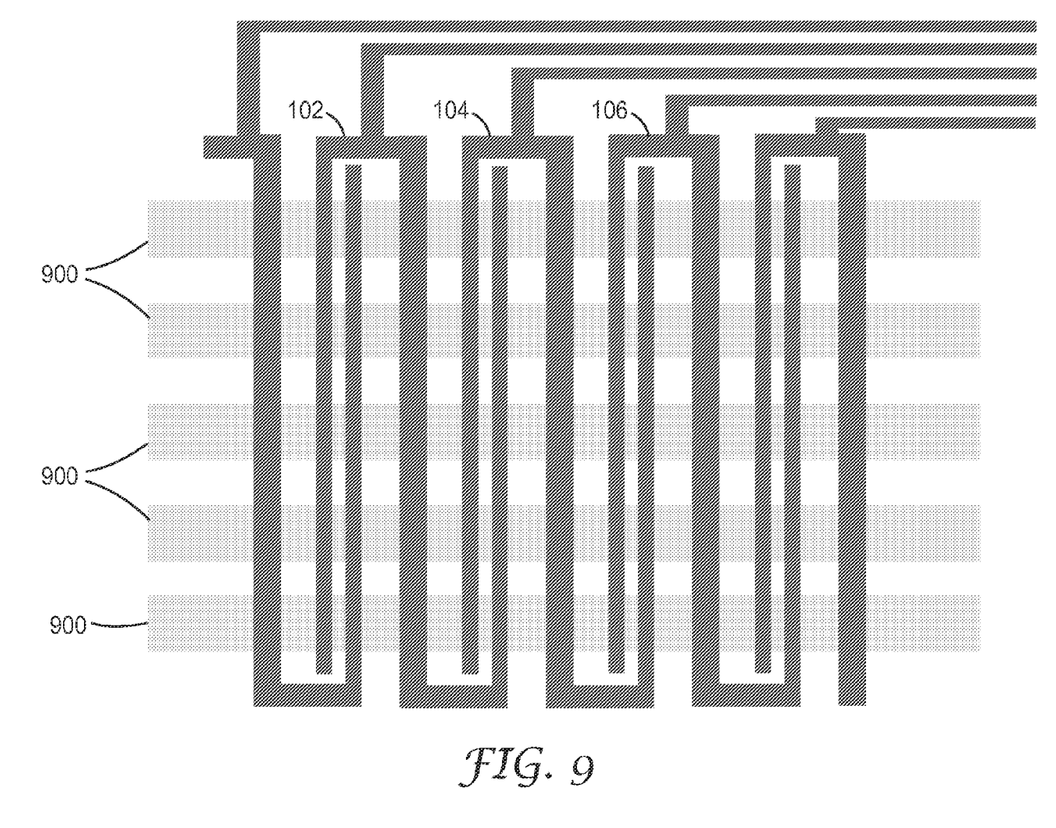
FIG. 9 is a top view of a stack of two arrays of elongate, electrically isolated conductive electrodes for use in a touch sensor.

In other embodiments, such as that illustrated in FIG. 9, the first array of electrodes, comprising first electrode 102, second electrode 104 and third electrode 106 may be similarly positioned opposite a second array 900, where the second array may be positioned as before on an opposing side of a common substrate or on a different surface of a different substrate stacked on the first substrate. However, in this embodiment, second array 900 may simply include a bar pattern of electrodes without interleaving of the electrodes.

This may be appropriate due to the lack of proximity to the touching object (stylus or finger), where, e.g., the first array is closer to the touch surface. In such a situation, the touching object (stylus or finger) may not interact as strongly with the second array and therefore the benefits of interleaving and respective distances between adjacent electrodes, and diameters of the electrodes, may be less important. Alternatively, the first array can be coupled in a sensor with a diamond-pattern of electrodes, or any other appropriate electrode pattern used in touch screen applications.

The touch sensor comprised of the first arrays described herein may further comprise circuitry configured to measure signals sensed using the electrode arrays and a touch processor coupled to the sensor circuitry and configured to determine a location of the touch in proximity with the touch surface based on the measured signals. In some implementations, at least a portion of the sensor circuitry can be disposed within a touch implement, for example provided in the form of a stylus.

The following is a list of exemplary embodiments of the present description.

Embodiment 1 is a first array of elongate, electrically isolated conductive electrodes disposed on a first major surface of a first substrate for use in a touch sensor, comprising:
 a first electrode;
 a second electrode; and
 a third electrode, wherein
 each of the first electrode, second electrode, and third electrode comprises a proximate end and a distal end,
 each of the first electrode, second electrode, and third electrode has a z-shape, wherein the z-shape includes a first elongate section, second elongate section, and a third elongate section, and wherein the elongate sections are oriented parallel to one another,
 the first electrode is interleaved with the second electrode, and
 the second electrode is interleaved with the third electrode.

Embodiment 2 is the array of embodiment 1, wherein each of the first electrode, second electrode, and third electrode is connected at its proximate end to a touch controller circuit.

Embodiment 3 is the array of embodiment 2, wherein each of the first electrode, second electrode, and third electrode is also connected at its distal end to the touch controller circuit.

Embodiment 4 is the array of embodiment 1, wherein the first electrode is connected at its proximate end to a touch controller circuit, the first electrode is not connected at its distal end to the touch controller circuit, the second electrode is connected at its distal end to the touch controller circuit, and the second electrode is not connected at its proximate end to the touch controller circuit.

Embodiment 5 is the array of embodiment 1, wherein the first elongate section of the second electrode is disposed between the second and third elongate sections of the first electrode, and the third elongate section of the second electrode is disposed between the first and second elongate sections of the third electrode.

Embodiment 6 is the array of embodiment 1, wherein the connection between the control circuit and the electrode at the proximate end of each electrode occur between the first and second parallel elongate sections of each electrode.

Embodiment 7 is the array of embodiment 1, wherein the second elongate section of each electrode functions as a primary sub-electrode.

Embodiment 8 is the array of embodiment 7, wherein the first and third elongate sections of each electrode function as auxiliary sub-electrodes.

Embodiment 9 is the array of embodiment 1, wherein the width of each of the first and third elongate sections of the electrodes is less than the width of each of the second elongate sections of the electrodes.

Embodiment 10 is the array of embodiment 1, wherein the electrodes are comprised of one or a combination of a transparent conductive material, a transparent conductive composite, a transparent conductive multilayer, and a transparent conductive mesh network of traces.

Embodiment 11 is the array of embodiment 10, wherein the transparent conductive material is one of indium tin oxide, zinc oxide, fluorine doped tin oxide, conductive polymer, or graphene.

Embodiment 12 is the array of embodiment 10, wherein the electrodes are comprised of transparent conductive mesh network of traces.

Embodiment 13 is the array of embodiment 12, wherein the mesh network of traces has a sheet resistance between 0.2 and 100 ohms per square.

Embodiment 14 is the array of embodiment 12, wherein the traces comprise silver.

Embodiment 15 is the array of embodiment 10, wherein the traces are formed in hexagonal, square, circle or other periodic patterns.

Embodiment 16 is the array of embodiment 10, wherein traces are formed in a random or pseudorandom arrangement.

Embodiment 17 is the array of embodiment 10, wherein the metal mesh comprises copper, silver, gold, aluminum, zinc, nickel, or iron.

Embodiment 18 is a touch sensor comprising the array of embodiment 1.

Embodiment 19 is the touch sensor of embodiment 18, wherein the touch sensor is intended for use with a stylus.

Embodiment 20 is the touch sensor of embodiment 19, wherein the distance between the first elongate section of the second electrode and the third elongate section of the first electrode is less than the diameter of a tip of the stylus.

Embodiment 21 is the touch sensor of embodiment 19, wherein the distance between the first elongate section of the second electrode and the second elongate section of the first electrode is less than 4× the diameter of a tip of the stylus.

Embodiment 22 is a touch sensor comprising the first substrate and the first array of embodiment 1, further comprising a second array of elongate, electrically isolated conductive electrodes disposed on a second major surface of the first major surface of the first substrate, comprising:
 a fourth electrode;
 a fifth electrode; and
 a sixth electrode, wherein
 each of the fourth electrode, fifth electrode, and sixth electrode comprises a proximate end and a distal end,
 each of the fourth electrode, fifth electrode, and sixth electrode has a z-shape, wherein the z-shape includes a first elongate section, second elongate section, and a third elongate section, and wherein the elongate sections are oriented parallel to one another,
 the fourth electrode is interleaved with the fifth electrode, and
 the fifth electrode is interleaved with the sixth electrode.

Embodiment 23 is the touch sensor of embodiment 22, wherein
 the first electrode, second electrode, and third electrode are oriented in a first direction;

the fourth electrode, fifth electrode, and sixth electrode are oriented in a second direction;
the first direction is orthogonal to the second direction; and
the first array overlaps the second array.

Embodiment 24 is a touch sensor comprising the first substrate and the array of embodiment 1, further comprising a second array of elongate, electrically isolated conductive electrodes disposed on a second major surface of a second substrate, comprising:
a fourth electrode;
a fifth electrode; and
a sixth electrode, wherein
each of the fourth electrode, fifth electrode, and sixth electrode comprises a proximate end and a distal end,
each of the fourth electrode, fifth electrode, and sixth electrode has a z-shape, wherein the z-shape includes a first elongate section, second elongate section, and a third elongate section, and wherein the elongate sections are oriented parallel to one another,
the fourth electrode is interleaved with the fifth electrode, and
the fifth electrode is interleaved with the sixth electrode.

Embodiment 25 is the touch sensor of embodiment 24, wherein
the first electrode, second electrode, and third electrode are oriented in a first direction;
the fourth electrode, fifth electrode, and sixth electrode are oriented in a second direction;
the first direction is orthogonal to the second direction; and
the first array overlaps the second array.

Embodiment 26 is the touch sensor of embodiment 24, wherein
the first electrode, second electrode, and third electrode are oriented in a first direction;
the fourth electrode, fifth electrode, and sixth electrode are oriented in a second direction;
the first direction is not parallel to the second direction; and
the first array overlaps the second array.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A first array of elongate, electrically isolated conductive electrodes disposed on a first major surface of a first substrate for use in a touch sensor, comprising:
a first electrode;
a second electrode; and
a third electrode, wherein
each of the first electrode, second electrode, and third electrode comprises a proximate end and a distal end,
each of the first electrode, second electrode, and third electrode has a z-shape, wherein the z-shape includes a first elongate section, second elongate section, and a third elongate section, and wherein the elongate sections are oriented parallel to one another,
the first electrode is interleaved with the second electrode, and
the second electrode is interleaved with the third electrode.

2. The array of claim 1, wherein each of the first electrode, second electrode, and third electrode is connected at its proximate end to a touch controller circuit.

3. The array of claim 2, wherein each of the first electrode, second electrode, and third electrode is also connected at its distal end to the touch controller circuit.

4. The array of claim 1, wherein the first electrode is connected at its proximate end to a touch controller circuit, the first electrode is not connected at its distal end to the touch controller circuit, the second electrode is connected at its distal end to the touch controller circuit, and the second electrode is not connected at its proximate end to the touch controller circuit.

5. The array of claim 1, wherein the first elongate section of the second electrode is disposed between the second and third elongate sections of the first electrode, and the third elongate section of the second electrode is disposed between the first and second elongate sections of the third electrode.

6. The array of claim 2, wherein the connection between the touch controller circuit and the electrode at the proximate end of each electrode occurs between the first and second parallel elongate sections of each electrode.

7. The array of claim 1, wherein the electrodes are comprised of one or a combination of a transparent conductive material, a transparent conductive composite, a transparent conductive multilayer, and a transparent conductive mesh network of traces.

8. The array of claim 7, wherein the electrodes are comprised of transparent conductive mesh network of traces.

9. A touch sensor comprising the array of claim 1.

10. A sensor system comprising a stylus and the touch sensor of claim 9, wherein the distance between the first elongate section of the second electrode and the second elongate section of the first electrode is less than 4 times the diameter of a tip of the stylus.

11. A touch sensor comprising the first substrate and the first array of claim 1, further comprising a second array of elongate, electrically isolated conductive electrodes disposed on a second major surface of the first substrate opposite the first major surface of the first substrate, comprising:
a fourth electrode;
a fifth electrode; and
a sixth electrode, wherein
each of the fourth electrode, fifth electrode, and sixth electrode comprises a proximate end and a distal end,
each of the fourth electrode, fifth electrode, and sixth electrode has a z-shape, wherein the z-shape includes a first elongate section, second elongate section, and a third elongate section, and wherein the elongate sections are oriented parallel to one another,
the fourth electrode is interleaved with the fifth electrode, and
the fifth electrode is interleaved with the sixth electrode.

12. The touch sensor of claim 11, wherein
the first electrode, second electrode, and third electrode are oriented in a first direction;

the fourth electrode, fifth electrode, and sixth electrode are oriented in a second direction;

the first direction is orthogonal to the second direction; and the first array overlaps the second array.

13. A touch sensor comprising the first substrate and the array of claim 1, further comprising a second array of elongate, electrically isolated conductive electrodes disposed on a second major surface of a second substrate, comprising:

a fourth electrode;

a fifth electrode; and a sixth electrode, wherein each of the fourth electrode, fifth electrode, and sixth electrode comprises a proximate end and a distal end, each of the fourth electrode, fifth electrode, and sixth electrode has a z-shape, wherein the z-shape includes a first elongate section, second elongate section, and a third elongate section, and wherein the elongate sections are oriented parallel to one another, the fourth electrode is interleaved with the fifth electrode, and the fifth electrode is interleaved with the sixth electrode.

14. The touch sensor of claim 13, wherein the first electrode, second electrode, and third electrode are oriented in a first direction;

the fourth electrode, fifth electrode, and sixth electrode are oriented in a second direction;

the first direction is orthogonal to the second direction; and the first array overlaps the second array.

15. The touch sensor of claim 13, wherein the first electrode, second electrode, and third electrode are oriented in a first direction;

the fourth electrode, fifth electrode, and sixth electrode are oriented in a second direction;

the first direction is not parallel to the second direction; and the first array overlaps the second array.

16. The array of claim 1, wherein the width of each of the first and third elongate sections of the electrodes is less than the width of each of the second elongate sections of the electrodes.

17. The array of claim 7, wherein the electrodes are comprised of transparent conductive material.

18. The array of claim 17, wherein the transparent conductive material comprises indium tin oxide, zinc oxide, fluorine doped tin oxide, conductive polymer, or graphene.

19. The array of claim 8, wherein the mesh network of traces has a sheet resistance between 0.2 and 100 ohms per square.

20. The array of claim 8, wherein the traces comprises one or more of copper, silver, gold, aluminum, zinc, nickel and iron.

* * * * *